3,845,158
ALKYLATION PROCESS WITH FLUORINATION STEP UTILIZING RECYCLED HF CATALYST
Jay E. Sobel, Highland Park, Ill., assignor to Universal Oil Products Company, Des Plaines, Ill.
Continuation-in-part of abandoned application Ser. No. 190,020, Oct. 18, 1971. This application June 21, 1972, Ser. No. 265,091
Int. Cl. C07c 3/54
U.S. Cl. 260—683.49          4 Claims

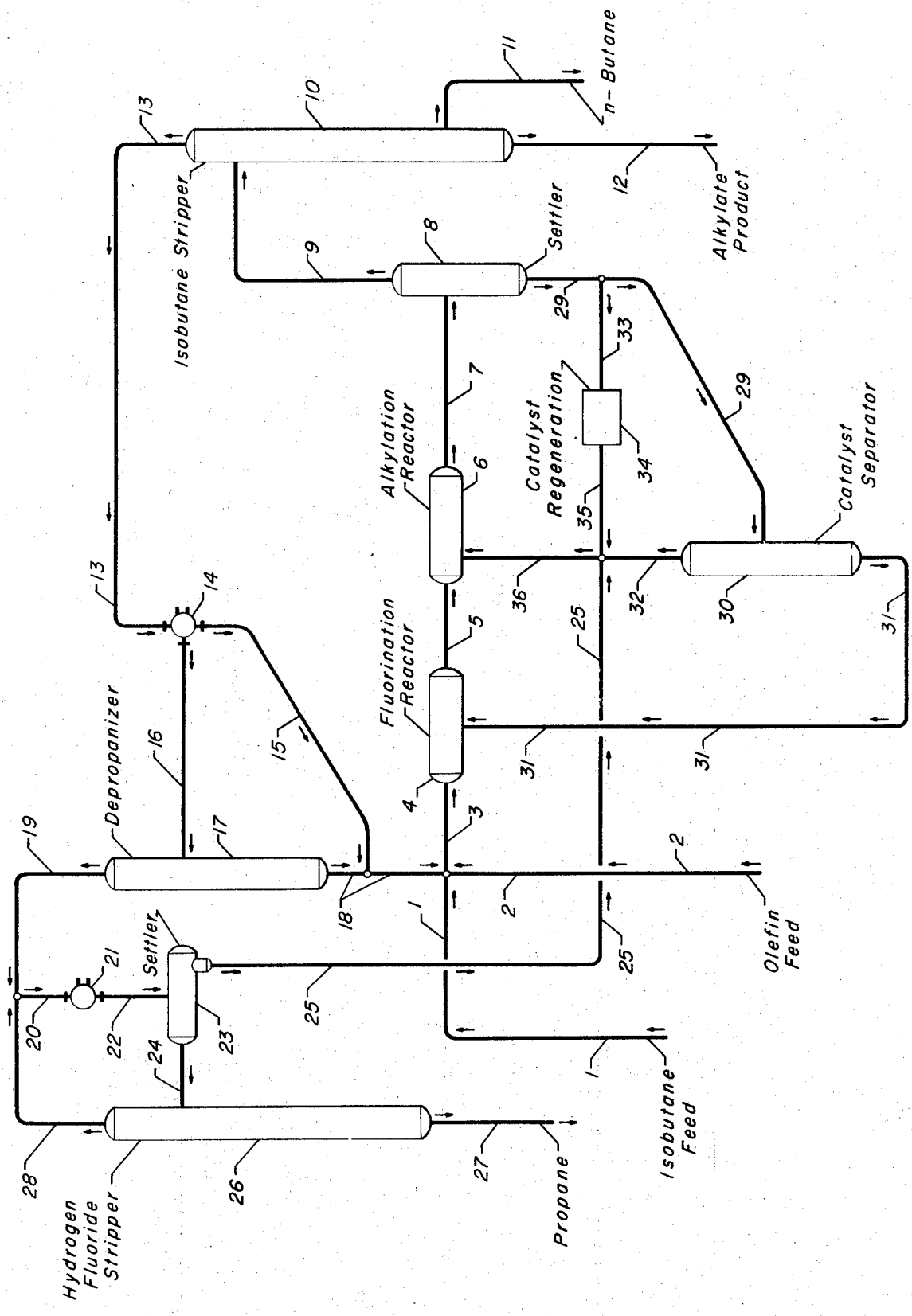

ABSTRACT OF THE DISCLOSURE

An improvement in a process for producing an alkylation reaction product from an isoparaffin and an olefin, utilizing hydrogen fluoride as a catalyst, which includes contacting the reactants with hydrogen fluoride diluted with about 30 wt. percent to about 70 wt. percent of an organic diluent at fluorination conditions in a fluorination zone, subsequently contacting the resulting mixture with more concentrated hydrogen fluoride at alkylation conditions in an alkylation zone, and recovering the alkylation reaction product from the effluent from the alkylation zone. The process is improved by introducing the reactants into the fluorination zone at a mole ratio of isoparaffin to olefin of about 0.5:1 to about 10:1.

CROSS REFERENCES TO RELATED APPLICATION

This application is a Continuation-In-Part of my copending application Ser. No. 190,020, filed on Oct. 18, 1971, now abandoned, all the teachings of which are incorporated herein.

BACKGROUND OF THE INVENTION

This invention relates to an improved process for alkylating an alkylatable isoparaffinic hydrocarbon with an olefinic hydrocarbon utilizing hydrogen fluoride as a catalyst. More specifically, this invention relates to an improved isoparaffin-olefin alkylation process in which the reactants are, first, contacted with hydrogen fluoride and an organic catalyst diluent in a fluorination zone, the effluent from the fluorination zone is contacted with high strength hydrogen fluoride in an alkylation zone, and the product of the process is recovered from the effluent from the alkylation zone.

Among the important products of hydrogen fluoride-catalyzed alkylation processes is the motor fuel alkylate produced by the reaction between an isoparaffin, typically isobutane, and an olefin such as propylene or butylenes. Generally, isobutane is alkylated with butene isomers or a mixture of propylene and butenes utilizing anhydrous hydrogen fluoride as a catalyst. The alkylate produced in such processes typically possesses a fairly high octane rating, and the octane rating of this hydrocarbon product can be easily and significantly improved by blending with it small amounts of alkyl lead compounds. There is, however, an increasing demand for motor fuels which possess the required high octane rating and are, at the same time, lead-free. The alkylation processes and apparatus which are currently in use will not produce a product of sufficiently high octane, in an economical operation, to satisfy the demand for the high octane unleaded product now required. The process of this invention supplies a convenient and economical method for producing the very high octane alkylate required for blending in unleaded motor fuels. It is well known in the alkylation art that the alkylation reaction product of the reaction between 1-butene and isobutane has a lower octane rating than the product produced by the alkylation of 2-butene or isobutylene with isobutane. It has been found that, if 1-butene is first converted into a corresponding alkyl halide and the alkyl halide is subsequently alkylated with isobutane, the alkylate product possesses an octane rating comparable to the product obtained from alkylating the other butene isomers. Various attempts have been disclosed to utilize fluorination of 1-butene to produce a higher octane alkylate product. The processes which have been disclosed all suffer to one degree or another from the defects of impracticality, complication and expense of operation. One reason for the difficulties encountered has been the dependence of previously disclosed processes on the use of hydrogen fluoride in solution in a hydrocarbon to fluorinate the 1-butene. The difficulty of maintaining a controlled solution of hydrogen fluoride, for example, in an isoparaffin, is obvious to one skilled in the art. The amount of hydrogen fluoride which will remain in solution in isobutane is quite limited, so that the amount of acid-saturated isobutane which must be provided in fluorinating the 1-butane is prohibitively and uneconomically large in comparison to the scale of a typical alkylation process. Under certain conditions, described in my copending application Ser. No. 190,020, a separate phase of hydrogen fluoride may be utilized to fluorinate 1-butene or other olefins, making possible the economical and practical use of prefluorination of olefins in a hydrogen fluoride catalyzed alkylation process.

Organic diluents are well known in the alkylation art. In general, it has been found that by utilizing as an alkylation catalyst hydrogen fluoride in which a specific concentration of organic diluent is dissolved, undesirable side reactions in the alkylation process may be inhibited in the alkylation process and an improved product recovered. The fraction of organic diluent utilized in the catalyst is usually maintained at about 5 to 25 wt. percent of the catalyst. Examples of organic diluents and their use in alkylation may be found in U.S. Pats. 3,408,419 and 3,538,183. The essential characteristics of organic diluents in general are their solubility in hydrogen fluoride and their molecular weight, which is typically higher than the molecular weight of the isoparaffin employed in the same process. In most commercial applications, the amount of hydrocarbons in solution in the hydrogen fluoride catalyst is regulated by regenerating a small portion of the previously used catalyst to remove soluble hydrocarbons and recover pure acid. In this way, the concentration of higher molecular weight hydrocarbons soluble in the hydrogen fluoride is kept at an optimum level. The term organic diluent is herein limited to hydrocarbons soluble in hydrogen fluoride which are of higher molecular weight than the reactants in the particular embodiment of an alkylation process in which the diluent is used.

It has been found preferably to conduct isoparaffin-olefin alkylation processes at particular conditions of temperature and pressure, and at specific concentrations of reactants and catalysts in order to produce an optimum yield of high quality alkylate product. A large molar excess of isoparaffin, relative to olefin, in the reaction mixture, generally about 10:1 to about 30:1, is one of the conditions required to provide even an adequate product. It has been found desirable in prior art to employ as large an excess of isoparaffin as possible, since the quality of alkylate product is improved thereby. Thus, a considerable amount of isoparaffin is generally recovered and recycled to the alkylation reactor after separation from the hydrocarbon phase of the reactor effluent. The large amount of isoparaffin which must accordingly be passed, unreacted, through the alkylation reactor and settler and separated from the alkylate product has necessitated the use of fractionation equipment of large capacity in order to provide an adequate separation of the product alkylate from the isoparaffin to the recycle. The expense and difficulty of providing a large isoparaffin throughput and recycle may be obviated, in part, through the use of the process of this invention.

SUMMARY OF THE INVENTION

It is an object of this invention to provide an improved isoparaffin-olefin alkylation process for producing an alkylate product useful as a motor fuel blending component and having excellent anti-knock properties. Another object of this invention is to provide an improved isoparaffin-olefin alkylation reaction product wherein fluorination of the olefinic reactant and subsequent alkylation of the resulting alkyl fluoride are employed, and a smaller charge of isoparaffinic reactant is required to provide a reaction product superior to that produced in conventional alkylation processes.

In an embodiment, the present invention relates to an improvement in a process for producing an alkylation reaction product from an isoparaffinic reactant and an olefinic reactant, which process includes, first, contacting said reactants with hydrogen fluoride and with an organic diluent in a fluorination zone at fluorination conditions, second, contacting at least a portion of the effluent from said fluorination zone with hydrogen fluoride in an alkylation zone at alkylation conditions, and, third, recovering said alkylation reaction product from the effluent from said alkylation zone, wherein the improvement comprises: introducing said reactant into said fluorination zone at a mol ratio of said isoparaffinic reactant to said olefinic reactant of about 0.5:1 to about 10:1.

In my copending application Ser. No. 190,020, it was disclosed that it is possible to employ hydrogen fluoride as a separate phase to fluorinate olefins to be utilized in an alkylation reaction. I have now found that the alkylation process in which fluorination is utilized, as described in my copending application, can be further and unexpectedly improved by maintaining the isoparaffin/olefin mol ratio in the fluorination and alkylation reaction zones at a much lower level than has been found practical in prior art. The alkylation reaction product thereby produced is of superior quality to that produced in conventional alkylation processes, while the difficulties and expense of separating and recycling large amounts of isoparaffin, as practiced in conventional alkylation processes, is at least partially obviated.

Various other objects and embodiments of the process of this invention will be obvious to those skilled in the art from the following description of the drawing and detailed description of the invention.

DESCRIPTION OF THE DRAWING

The attached drawing is a schematic representation of one embodiment of the process of this invention. The drawing is intended to represent only one embodiment of this invention, and is not intended to constitute a limitation on the scope of the present invention nor to limit the embodiments of the invention to the one represented.

Referring to the drawing, isobutane feed is introduced into the process through conduit 1. Olefin feed is introduced through conduit 2. The reactants in conduits 1 and 2 are commingled in conduit 3 and charged therethrough to fluorination reactor 4. In contrast to conventional alkylation processes, the isobutane/olefin mol ratio is optimally maintained at about 4:1 to about 8:1 in the feed to fluorination reactor 4. In reactor 4, the reactants are intimately contacted with a fluorination mixture comprising equal amounts, by weight, of hydrogen fluoride and an organic diluent comprising polymers of isobutylene having molecular weight in the range from about 200 to about 500. A residence time for the resulting mixture of catalyst, diluent, reactant and reaction products of about five minutes to about twenty minutes, a catalyst/hydrocarbon weight ratio of about 0.1/1 to about 5/1, a temperature of about 25° F. to about 100° F. and a pressure sufficient to provide liquid phase operations are maintained in fluorination reactor 4. The resulting mixture of catalyst, diluent, reactants and reaction product is withdrawn from fluorination reactor 4 and charged through conduit 5 into alkylation reactor 6. In reactor 6, the effluent from fluorination reactor 4 is contacted with high strength substantially anhydrous fluoride, comprising more than about 85 wt. percent titratable acid, introduced into alkylation reactor 6 through conduit 36. The resulting alkylation reaction mixture is passed through reactor 6 at a residence time of about one minute to about twenty mintues, a temperature of about 50° F. to about 250° F., a catalyst/hydrocarbon weight ratio of about 0.1/1 to about 5/1 and a pressure sufficient to provide liquid phase operations. The reaction mixture is withdrawn from reactor 6 and passed through conduit 7 into settler 8. The alkylate product and unconsumed reactants, if any, in the effluent from reactor 6 form an upper, hydrocarbon phase in settler 8 and are withdrawn overhead through conduit 9. This hydrocarbon phase is charged through conduit 9 to isobutane stripper 10. In isobutane stripper 10, which is, according to the present invention, smaller than the isobutane stripper required in a conventional isoparaffin-olefin alkylation process, n-butane is separated and withdrawn as a side cut through conduit 11. The alkylate product is separated and recovered in the bottom from stripper 10 through conduit 12. Isobutane, any entrained or dissolved hydrogen fluoride and any lighter gases are withdrawn overhead from stripper 10 through conduit 13, and passed to partial condensor 14. In partial condensor 14, isobutane is at least partially liquefied and withdrawn via conduit 15. The isobutane in conduit 15 is charged to conduit 18. The portion of the overhead from stripper 10 which is not liquefied in partial condensor 14 is withdrawn from condensor 14 through conduit 16 and charged to depropanizer 17. In depropanizer 17, isobutane is separated and withdrawn as a bottoms product via conduit 18, combined with isobutane from conduit 15, and passed into conduit 3. Hydrogen fluoride and propane, and any lighter gases, in the depropanizer 17 are withdrawn overhead and charged, via conduits 19 and 20, to heat exchanger 21, in which the stream from conduit 20 is cooled. The cooled effluent from heat exchanger 21 is charged through conduit 22 to settler 23. In settler 23, a lower concentrated hydrogen fluoride phase separates and is withdrawn via conduit 25. An upper hydrocarbon phase which forms in settler 23 is withdrawn and charged through conduit 24 to hydrogen fluoride stripper 26. In stripper 26, propane is separated and withdrawn as a bottoms product and passed out of the process through conduit 27. Hydrogen fluoride, admixed with some propane, is withdrawn overhead from stripper 26 and charged via conduits 28 and 20 to heat exchanger 21. Referring again to settler 8, hydrogen fluoride and organic diluent form a lower phase and are withdrawn through conduit 29 and charged to catalyst separator 30. In catalyst separator 30, highly concentrated hydrogen fluoride is separated and withdrawn overhead in conduit 32. A mixture of approximately equal weight of hydrogen fluoride and organic diluent is withdrawn from catalyst separator 30 as a bottoms product via conduit 31, and charged to fluorination reactor 4. A slip stream of the hydrogen fluoride phase withdrawn from settler 8 is withdrawn from conduit 29 and charged through conduit 33 to catalyst regeneration unit 34. Concentrated hydrogen fluoride is recovered from regeneration unit 34 and passed through conduit 35 into conduit 36. The concentrated hydrogen fluoride streams in conduits 25, 32 and 35 are combined in conduit 36 and charged to alkylation reactor 6.

DETAILED DESCRIPTION OF THE INVENTION

Isoparaffins which may be suitably employed in the process of the present invention include isobutane, 2-methyl-2-butane, 2-methyl-2-pentane, and similar higher molecular weight isoparaffins. Isobutane is the preferred isoparaffinic reactant. A conventional isobutane feed stock such as that used in a conventional alkylation process, may be utilized in the present process. A conventional isobutane feed stock generally comprises about 90% or more isobutane with small amounts of, for example, propane, normal butane, olefins, etc.

The olefinic hydrocarbons suitable for use in the process of the present invention include generally $C_3$-$C_6$ monoolefins. The preferred olefinic reactants are those used in conventional isoparaffin-olefin alkylation processes including propylene, 1-butene, 2-butene, isobutylene, and sometimes amylenes. Because of the improvement in the quality of the alkylation reaction product produced when 1-butene is fluorinated and subsequently reacted with an isoparaffin, 1-butene is a particularly preferred olefinic reactant for use in the present process. When the present inventive process is applied to the alkylation of isobutane with 1-butene, the alkylation reaction product comprises a mixture of octane isomers. In conventional alkylation processes, the alkylation reaction product of a reaction between isobutane and 1-butene normally contains large fractions of relatively low octane methylheptanes and dimethylhexanes. The present process provides an alkylation reaction product, using the same reactant, having substantially smaller fractions of the undesirable low octane isomers and substantially larger fractions of the desired trimethylpentanes.

The hydrogen fluoride-containing phase which is charged to the fluorination zone in the present process comprises about 30 wt. percent to about 70 wt. percent organic diluent. It is to be understood that the term organic diluent is not intended to include isoparaffinic reactants. In general, the isoparaffinic reactants utilized in alkylation processes are mutually soluble with hydrogen fluoride only to a very limited extent. It is essential to the present process that organic diluent utilized be mutually soluble with hydrogen fluoride to a very substantial extent. For example, a suitable organic diluent, when admixed with an equal weight of hydrogen fluoride, would be completely miscible with the acid at a temperature of 50° F. and a pressure sufficient to provide a liquid acid phase. Examples of suitable organic diluents include polymers of isobutylene, polymers of 1-butene, polymers of 2-butene, polymers of propylene, polycyclic aromatic hydrocarbons, etc. In general, a suitable organic diluent has a molecular weight of about 200 to about 500. The term high strength hydrogen fluoride catalyst is intended to include catalyst containing more than about 70 wt. percent hydrogen fluoride, and preferably greater than about 90 wt. percent hydrogen fluoride, and is intended to include, for example, conventional hydrogen fluoride alkylation catalyst and also to include substantially pure hydrogen fluoride.

Fluorination conditions suitable in the present process include a temperature of about −25° F. to about 150° F. and a pressure of about 1 atmosphere to about 40 atmospheres. Contact time for the reaction mixture formed from the reactants, hydrogen fluoride and organic diluent in the fluorination zone, (contact time being defined as the volume of the reaction zone divided by the volume of reactants, catalyst and diluent charged per minute), is about 0.01 minute to about 60 minutes. Preferred fluorination conditions include a temperature between about 60° F. and about 80° F., a pressure sufficient to maintain the reaction mixture in liquid phase, and a contact time of about one minute to about twenty minutes. The amount of isoparaffinic and olefinic reactants charged to the fluorination zone is about 0.1 vol. percent to about 500 vol. percent of the amount of combined hydrogen fluoride and organic diluent charged to the fluorination zone. Preferably, the amount of combined reactants charged is about 100 vol. percent to about 200 vol. percent of the combined acid and diluent charged.

The fluorination zone employed in an embodiment of the present process may suitably be any vessel, reactor or other means which is capable of containing the reactants, catalyst, diluent and reaction products at the above-described fluorination conditions. For example, many alkylation reactors disclosed in prior art are suitable. Preferably, the fluorination zone includes means for admixing and intimately contacting the various elements of the fluorination reaction mixture which comprises reaction products, reactants, hydrogen fluoride and organic diluent. Such means may include, for example, mechanical stirring apparatus, baffle sections, perforated trays, column packing, etc. The fluorination step in the present process may be performed in a batch operation or a continuous operation. Because of known economic advantages and simplicity of performance, a continuous operation is preferred for the fluorination step in the present process.

A suitable alkylation zone employed in the process of this invention may be an alkylation reactor which will suitably contain and intimately contact the effluent from the fluorination zone with high strength hydrogen fluoride catalyst at alkylation conditions. Among the suitable alkylation zones are a large number of alkylation reactors known in prior art. Such alkylation reactors typically include means for intimately contacting components of the alkylation reaction mixture. The alkylation step in the present process may be performed as a batch operation or a continuous operation. It is preferred that a continuous operation be employed. It is preferred to continuously charge the effluent from the fluorination zone and the high strength hydrogen fluoride catalyst to the alkylation zone and to continuously withdraw the alkylation reaction mixture, comprising reaction products, hydrogen fluoride, organic diluent and unconsumed reactants.

Alkylation conditions to be employed in the alkylation zone in the present process include a temperature of about 0° F. to about 200° F. and a pressure of about 1 atmosphere to about 40 atmospheres. The weight ratio of hydrocarbons to catalyst, where the weight of catalyst includes organic diluent, is maintained between about 0.1:1 and about 5:1. Contact time in the alkylation zone is maintained at about 0.1 minute to about thirty minutes. Particularly preferred alkylation conditions, when the present process is applied to the use of isobutane and 1-butene reactants, include a temperature of about 50° F. to about 150° F., a pressure sufficient to maintain liquid phase operations, and a catalyst/reactant weight ratio of about 0.5:1 to about 2:1.

Means for separating the hydrocarbon phase from the hydrogen fluoride phase in the effluent from an alkylation reactor are well known in the alkylation art. Generally, the effluent from the alkylation reactor comprises a mixture of isoparaffin, alkylation reaction products, hydrogen fluoride and organic diluent with small amounts of, for example, alkyl fluorides, propane, etc. When the alkylation reactor effluent is allowed to stand unstirred, the reaction products, isoparaffin, and lighter hydrocarbons form a lighter hydrocarbon phase, while the hydrogen fluoride and organic diluent form a heavier phase. The phases are easily mechanically separable. Subsequently, light gases, isoparaffin, and other lower boiling components of the hydrocarbon phase, are separated from the alkylation reaction product by fractionation, or other means, and the reaction product is recovered.

The isoparaffin and any hydrogen fluoride recovered in fractionation of the hydrocarbon phase are conventionally processed and recycled to the alkylation reactor for further use. Any suitable means for recovering the alkylation reaction product is suitable for use in the present process. Because of the relatively small amount of isoparaffin, e.g. isobutane, required to provide optimum fluorination and alkylation conditions in the present process, the cost of separating excess isoparaffin from the alkylation reaction product in the present process is significantly less than in conventional alkylation processes. The fractionation means, sometimes known as the isostripper, normally employed to separate isobutane from alkylate in conventional alkylation processes is one of the more significant economic factors in a typical alkylation scheme in terms of capital expense and the costs of operation. By reducing the amount of isobutane which must be separated, a significant savings in investment in utilities and capital can be achieved. Further, in some petroleum refineries, the supply of isobutane is a limiting factor in alkylation processes. By utilizing a smaller initial charge of isobutane, the process of the present invention provides an improvement over conventional alkylation processes in that less isobutane is lost through self-alkylation, also known as hydrogen transfer reaction. Thus, both the cost of initially supplying sufficient isobutane and of separating excess isobutane from alkylate are at least in part obviated by the process of the present invention.

The hydrogen fluoride phase recovered from the effluent from the alkylation zone is generally recycled to the alkylation zone, a minor portion being withdrawn and regenerated to remove excess water and acid soluble hydrocarbons. One suitable and convenient method for providing a relatively organic diluent-free hydrogen fluoride stream and a diluent-containing stream having a high concentration of hydrocarbons soluble in hydrogen fluoride, is to subject the hydrogen fluoride phase recovered from the settling operation to fractionation. The overhead vapors are recovered as the diluent-free concentrated acid stream, and the bottoms liquids are recovered as the diluent-rich stream. The diluent-rich catalyst stream comprises about 30 to about 70 wt. percent organic diluent, and preferably from about 40 wt. percent to about 60 weight percent. Beside the diluent-free hydrogen fluoride which may be recovered as described above, other sources of relatively diluent-free hydrogen fluoride may be utilized. For example, the hydrogen fluoride recovered from a cataylst regeneration unit or a conventional hydrogen fluoride stripper may conveniently be utilized to provide at least a portion of the high strength alkylation catalyst. It is preferred that the hydrogen fluoride utilized in the alkylation zone be relatively low in organic diluent content. For example, a suitable hydrogen fluoride catalyst to be charged to the alkylation zone might contain no organic diluent hydrocarbons or might contain up to about 30%, by weight, of organic diluent at most. It is preferred that all hydrogen fluoride streams utilized in the present process be maintained with a water content less than about 2 wt. percent.

Example I

In order to illustrate the novelty and advantages of the process of the present invention over conventional alkylation processes, the present process is compared to a conventional alkylation process as follows.

A supply of isobutane feed is obtained which contains 95 mole percent isobutane, 4 mole percent normal butane and 1 mole percent propane. A supply of olefinic feed stock is obtained which contains 35 mole percent 1-butene, 35 mole percent 2-butene and 30 mole percent isobutylene. In the first run, a portion of the isobutane feed is combined with a portion of the olefinic feed at an isobutane feed/olefin feed mole ratio of 6:1. The combined isobutane and olefin are charged to a conventional isoparaffin-olefin alkylation reactor. A portion of a supply of conventional hydrogen fluoride alkylation catalyst, containing 90 wt. percent acid, 1 wt. percent water and 9 wt. percent organic diluent, is also charged to the reactor. The catalyst and hydrocarbons are commingled in the alkylation reactor at a catalyst/hydrocarbon volume ratio of 1.5:1. A temperature of 80° F. and a pressure sufficient to provide liquid phase operations in the alkylation reactor are maintained. After a residence time of 8 minutes, the catalyst and hydrocarbons are withdrawn from the alkylation reactor and the catalyst is separated by a conventional settling technique. The hydrocarbons are fractionated, and the $C_5+$ fraction is recovered as the alkylation reaction product. The product of the first conventional run is analyzed and found to have a research octane number of only 94 and a motor octane number of only 91.

In the second run, a second portion of the isobutane feed stock is combined with a second portion of the olefinic feed stock. In this run, the isobutane feed/olefin feed mole ratio is maintained at 14:1. The combined isobutane and olefins are charged to the same conventional isoparaffin-olefin alkylation reactor as was employed in the first run. A second portion of the supply of conventional hydrogen fluoride catalyst, containing 90 wt. percent acid, is also charged to the alkylation reactor. The catalyst and hydrocarbons are commingled in the alkylation reactor at a catalyst/hydrocarbon volume ratio of 1.5:1. At temperature of 80° F. and a pressure sufficient to provide liquid phase operations in the alkylation reactor are maintained. After a residence time of 8 minutes, the catalyst and hydrocarbons are withdrawn from the alkylation reactor and the catalyst is separated by a conventional settling technique. The hydrocarbons are fractionated, and the $C_5+$ fraction is recovered as the alkylation reaction product. The product of the second conventional run is analyzed and found to have a research octane number of 96 and a motor octane number of 93.

In the third run, a third portion of the isobutane feed stock is combined with a third portion of the olefinc feed stock and employed in the process of the present invention. In this run, the isobutane feed/olefin feed mole ratio is maintained at 6:1, the same mole ratio as employed in the first, conventional run. The combined isobutane and olefins are charged to a second conventional reactor, distinct from the alkylation reactor employed in the first and second runs. A mixture of 50 vol. percent hydrogen fluoride and 50 vol. percent polyisobutylene having an average molecular weight of 400 is also charged to the second reactor. The volume ratio of the combined isobutane and olefins feed to the hydrogen fluoride and organic diluent is maintained at 2/3. A temperature of 68° F. and a pressure sufficient to provide liquid phase operations are maintained in the reactor. After a residence time of about 10 minutes, the mixture in the reactor is withdrawn and passed into the conventional alkylation reactor employed in the first and second runs. Substantially pure hydrogen fluoride is also charged sufficient to provide a catalyst strength of 90 wt. percent acid in the alkylation reactor. The catalyst and hydrocarbons are maintained at a catalyst/hydrocarbon volume ratio of 1.5:1 in the alkylation reactor. A temperature of 80° F. and a pressure sufficient to provide liquid phase operations in the alkylation reactor are maintained. After a residence time of 8 minutes, the catalyst and hydrocarbons are withdrawn from the alkylation reactor and the catalyst is separated by a conventional settling technique. The hydrocarbons are fractionated, and the $C_5+$ fraction is recovered as the alkylation reaction product. The product of the third run is analyzed and found to have a research octane number of 96 and a motor octane number of 93.

The foregoing clearly demonstrates that the process of the present invention provides a novel method for producing a superior alkylation reaction product in an isoparaffin-olefin alkylation process, using a lower isoparaffin/olefin mole ratio, which cannot be achieved when a conventional alkylation process is employed, using the same low isoparaffin/olefin mole ratio.

I claim as my invention:

1. A process for producing hydrocarbon alkylate which comprises
    (a) introducing to a fluorination zone an isoparaffinic reactant and an olefinic reactant in a mole ratio of isoparaffin to olefin of about 0.5:1 to about 10:1;
    (b) recycling to said zone a hydrogen fluoride catalyst containing from about 40 wt. percent to about 60 wt. percent of organic diluent consisting essentially of hydrocarbon polymer having a molecular weight of from about 200 to about 500, said polymer being soluble in hydrogen fluoride;

(c) reacting hydrogen fluoride with the olefinic reactant in said zone to form alkyl fluoride;

(d) reacting the effluent from said fluorination zone with hydrogen fluoride alkylation catalyst of at least 85 wt. percent titratable acidity to form an alkylate; and (e) recovering said alkylate from the effluent of step (d).

2. The process of Claim 1 further characterized in that said isoparaffinic reactant is isobutane and said olefinic reactant is selected from 1-butene, 2-butene, isobutylene, and propylene.

3. The process of Claim 1 further characterized in that said reactants are introduced into said fluorination zone at a mole ratio of said isoparaffinic reactant to said olefinic reactant of about 4:1 to about 8:1.

4. The process of claim 1 further characterized in that said polymer is polyisobutylene.

References Cited

UNITED STATES PATENTS

| | | | |
|---|---|---|---|
| 2,387,162 | 10/1945 | Matuszak | 260—683.48 |
| 2,399,368 | 4/1946 | Matuszak | 260—683.48 |
| 3,408,419 | 10/1968 | Herber et al. | 260—683.48 |
| 2,382,899 | 8/1945 | Newman | 260—683.48 |
| 2,403,501 | 7/1946 | Clarke | 260—683.48 |

FOREIGN PATENTS

| | | | |
|---|---|---|---|
| 592,345 | 9/1947 | England | 260—683.48 |

DELBERT E. GANTZ, Primary Examiner

G. J. CRASANAKIS, Assistant Examiner